No. 836,715. PATENTED NOV. 27, 1906.
F. L. SMITH.
VALVE AND VALVE DISK CUTTING MACHINE.
APPLICATION FILED SEPT. 14, 1905.
3 SHEETS—SHEET 1.
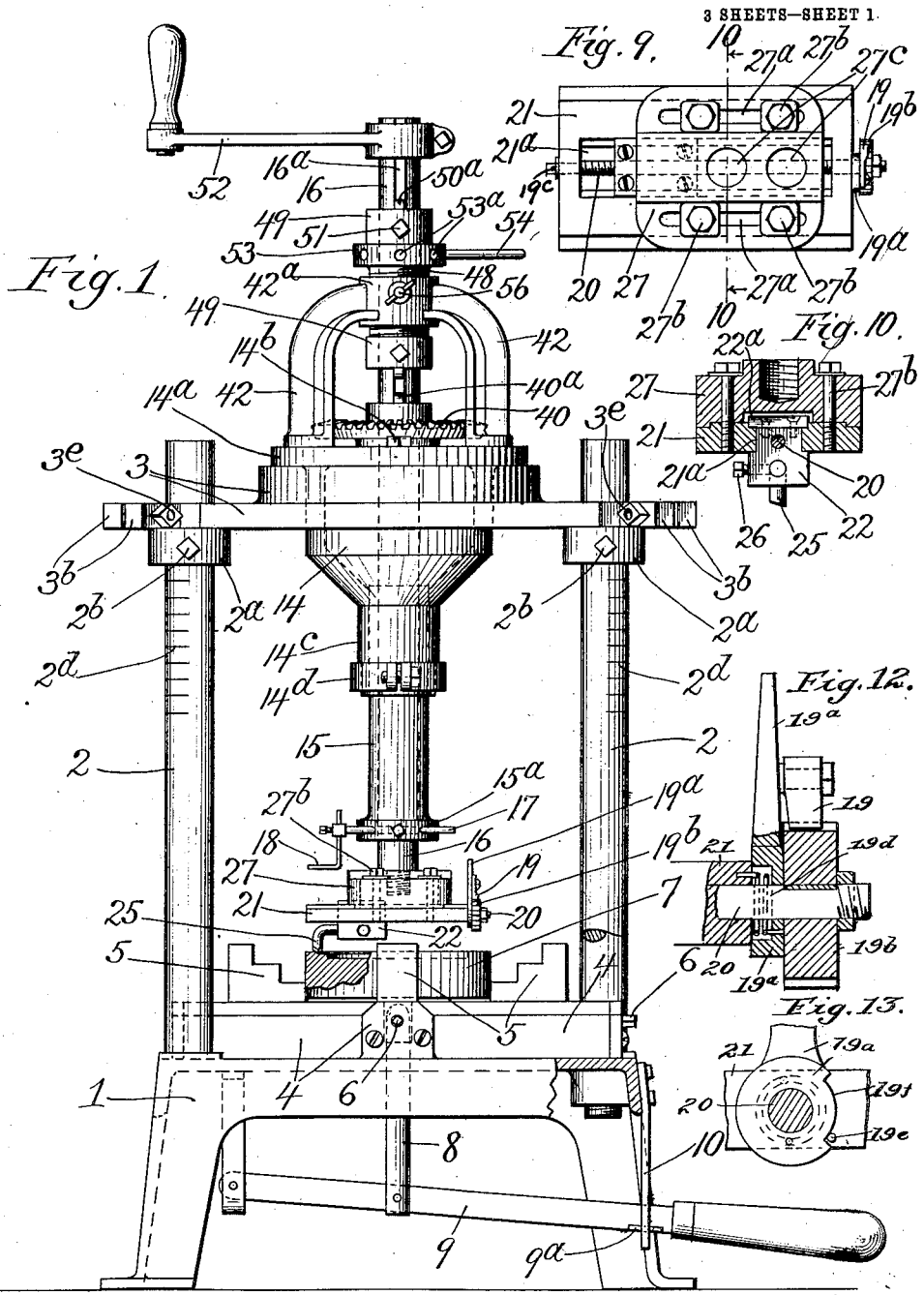

No. 836,715. PATENTED NOV. 27, 1906.
F. L. SMITH.
VALVE AND VALVE DISK CUTTING MACHINE.
APPLICATION FILED SEPT. 14, 1905.

3 SHEETS—SHEET 2.

Witnesses.
Edward F. Wray.
J. S. Abbott

Inventor.
Frank L. Smith
by Burton & Burton
his Attys.

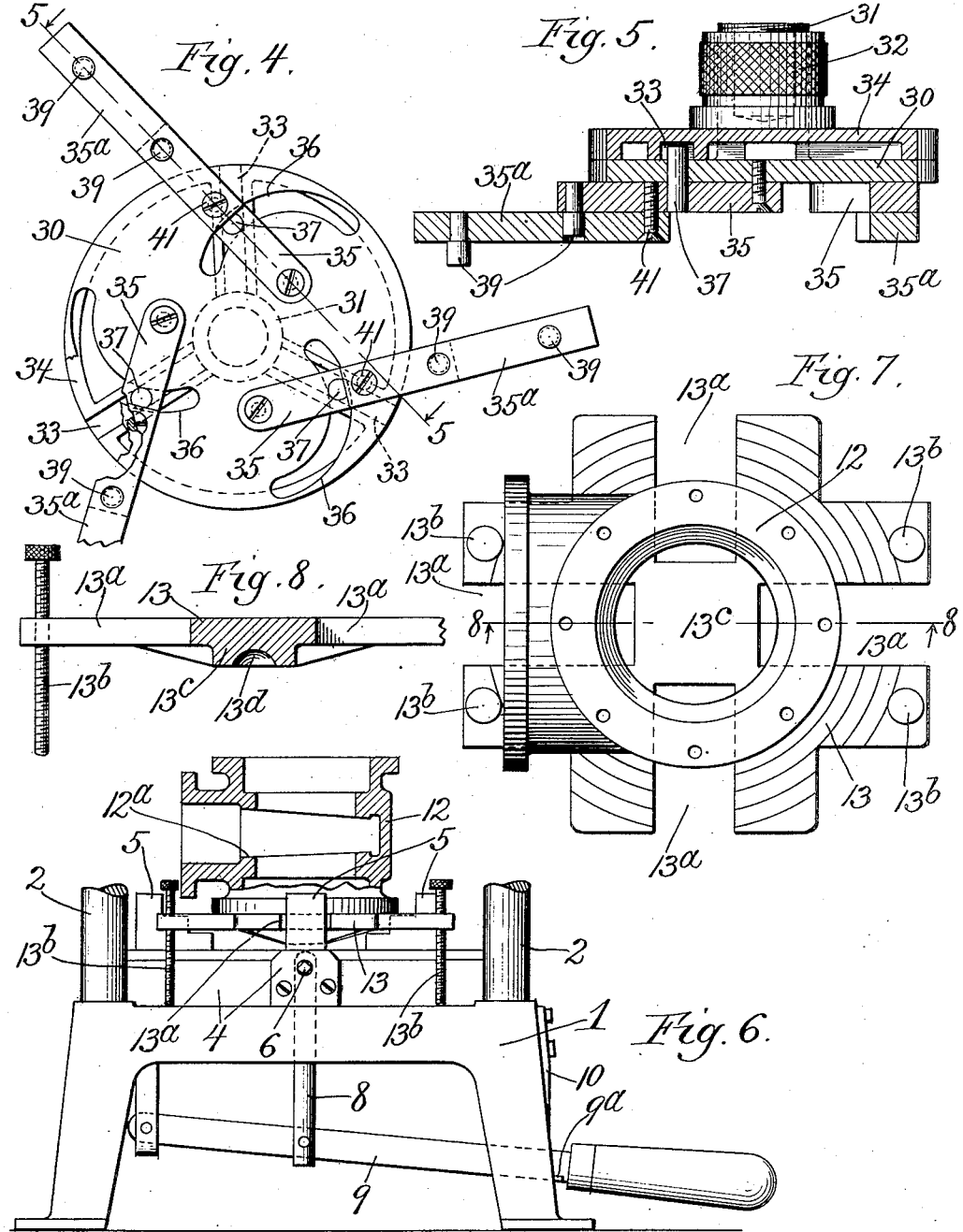

UNITED STATES PATENT OFFICE.

FRANK L. SMITH, OF CHICAGO, ILLINOIS, ASSIGNOR OF ONE-HALF TO ALVA C. RICKSECKER, OF CHICAGO, ILLINOIS.

VALVE AND VALVE-DISK-CUTTING MACHINE.

No. 836,715.　　　Specification of Letters Patent.　　　Patented Nov. 27, 1906.

Application filed September 14, 1905. Serial No. 278,389.

*To all whom it may concern:*

Be it known that I, FRANK L. SMITH, a citizen of the United States, residing at Chicago, in the county of Cook and State of Illinois, have invented new and useful Improvements in Valve and Valve-Disk-Cutting Machines, of which the following is a specification, reference being had to the accompanying drawings, forming a part thereof.

The purpose of this invention is to provide improved means for dressing, truing-up, or recutting valves and valve disks and seats, and for similar or analogous purposes.

It consists in the features and elements of construction set out in the claims.

Figure 11:
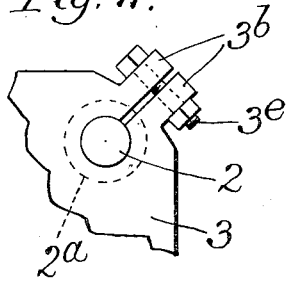
Figure 2:
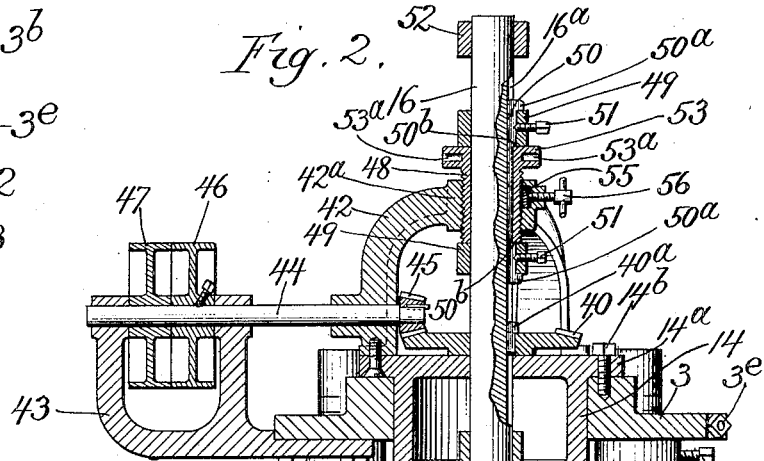
Figure 3:
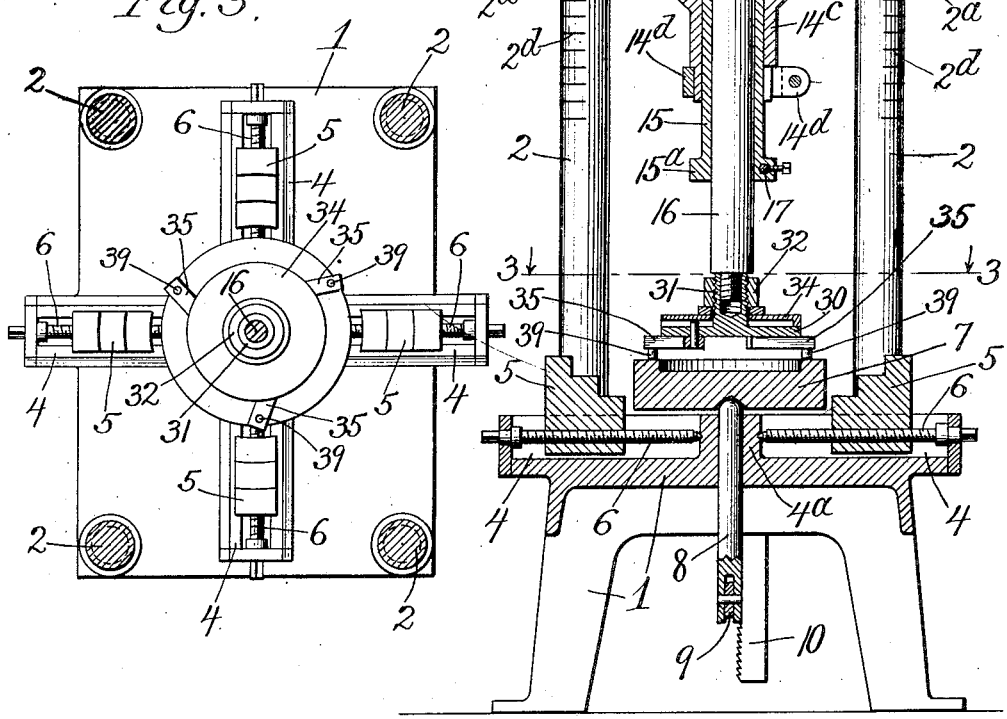

In the drawings, Figure 1 is a side elevation of a machine embodying this invention. Fig. 2 is an axial section of the same. Fig. 3 is a section at the line 3 3 on Fig. 2. Fig. 4 is a bottom side plan view of a leveling device for use with the machine and is a part thereof in certain processes. Fig. 5 is a section at the line 5 5 on Fig. 4. Fig. 6 is a detail side elevation, partly sectional, showing the lower part of the machine and a valve-body mounted therein for dressing valve-seats, the valve-body being shown in section axially with respect to the seat's vertical section. Fig. 7 is a plan view of a leveling-carrier for a valve-body or other part to be mounted, as shown in Fig. 6. Fig. 8 is a section at the line 8 8 on Fig. 7. Fig. 9 is a plan view of the tool-holder. Fig. 10 is a section at the line 10 10 on Fig. 9. Fig. 11 is a detail plan of one corner of the upper platform. Fig. 12 is a detail section at the line 12 12 on Fig. 9. Fig. 13 is a detail section at the line 13 13 on Fig. 12.

This machine has a rigid frame comprising a base 1, legs or standards 2, erected upon the base, and an upper platform 3, mounted adjustably as to height upon the legs 2. The base is constructed with four channels or guideways 4 for gripping-jaws 5, which are advanced and retracted radially with respect to the axis of the machine by feed-screws 6 in a manner fully shown in Figs. 2 and 3, familiar for such purposes and requiring no specific description. Articles of simple form, such as the circular valve-disk 7, being lodged upon the center boss $4^a$ of the base are designed to be forced upward against any leveling device which may be carried by the tool-holder, as hereinafter explained, by means of a plunger 8, mounted at the center of the base and connected with the lever 9 for thrusting it upwardly against the under side of the disk 7, a ratchet-bar 10 being mounted upon the side of the frame for engagement with a tooth $9^a$ of the lever 9 to hold the disk firmly up against the leveling device while the clamping-jaws 5 are set up to engage it. The leveling device, as hereinafter explained, is adapted also to assist the operator in centering the disk, which will be done at the same time with the leveling.

For other forms of articles to be dressed, as a valve-body 12, (see Fig. 6,) a carrier is preferably provided. Such carrier 13 is shown in Fig. 7, being in form adapted to be lodged on the base between the four corner legs or standards of the frame and having four radial openings $13^a$, corresponding in position to the four channels 4 and adapted thereby to constitute paths for the jaws 5 in the adjustment of the latter to engage the work. The carrier 13 has four adjustable legs $13^b$, same being threaded and screwed through the carrier at four points suitable to adapt them to support it and adjust it for leveling, these four threaded legs being stepped upon the base, as seen in Fig. 6. The center or hub $13^c$ of the carrier has at the under side a hemispherical socket or recess $13^d$, adapted to seat the upper end of the thrust-rod 8, so that the handle 9, operating the thrust-rod, may uplift the carrier and any work lodged thereon, as the valve-body 12, to force the face to be dressed, as the valve-seat $12^a$, up against any leveling device, and when said face is thus leveled, the threaded legs $13^b$ being severally screwed down to the bearing upon the base, the carrier is definitely fixed in position for holding the surface to be dressed in the proper plane. The work may be centered on the carrier at the same time, and while it is still held firmly against the leveling device by the engagement of the handle-tooth $9^a$ with the ratchet 10 the jaws 5 will be set up for engaging the work.

The platform 3 has a central opening through which extends a hanger 14, in which the vertical tool-operating shaft is journaled, said hanger having a flange $14^a$ for stopping at the upper side of the platform, and by means of which it is secured to the latter by bolts $14^b$. Below the platform within the space defined by the legs or standards 2 the hanger is reduced in diameter and forms a bearing 14°, through which extends a long sleeve 15. At the lower end of the bearing 14° it is reduced in diameter and split so that it may be contracted about the sleeve, and a clamping-collar 14ᵈ is applied to the reduced portion to thus contract it and cause it to grip the sleeve to hold the latter at any position to which it may be adjusted longitudinally in the bearing. This sleeve constitutes the immediate bearing of the tool-operating shaft 16. At the lower end of the sleeve 15 it is enlarged, forming a flange 15ᵃ, in which there is adjustably secured a rod 17, which extends non-radially from the flange and has an adjustable finger 18 for operating one form of tool-holder. (Shown in Fig. 1.) In this tool-holder there is a screw-shaft 20, which extends through the tool-holder bar 21 transversely with respect to the tool-operating shaft 16, and pivotally mounted on the screw-shaft at the end of the bar 21 there is a pawl-lever 19ᵃ, having a pawl 19, which engages a ratchet-wheel 19ᵇ, fast on the screw-shaft. The finger 18 encounters the pawl-lever 19ᵃ in each revolution of the shaft 16 and actuates the screw-shaft 20 for advancing the tool a distance dependent on the adjustment of the finger 18. A spring 19ᵈ operates to retract the pawl-lever, such retracting movement being stopped by a pin 19ᵉ, projecting from the edge of the bar 21, for which a segmental recess 19ᶠ is made in the margin of the hub portion of the lever 19ᵃ.

The tool-holder consists of the bar 21, having a parallel side aperture 21ᵃ extending nearly from end to end of the bar. In this aperture the tool-block 22 is guided for sliding longitudinally of the bar, being retained by the retaining-plate 22ᵃ and operated for sliding by the screw-shaft 20, which is journaled in the ends of the bar 21 and longitudinally stopped by the ratchet-wheel 19ᵇ at one end and by a cotter-pin and washer 19ᶜ at the other end and which is screwed through the tool-block. The tool 25 has its shank set through the block 22, blocked and secured by a set-screw 26, holding the cutting end of the tool at the proper angle for the work. The tool-holder bar 21 is secured on the shaft 16 by means of a head 27, which has two threaded holes 27ᶜ, at either of which it may be screwed onto the reduced and threaded end of said shaft, and the bar is made further adjustable with respect to the head by being secured thereto by bolts 27ᵇ, which take through longitudinal slots 27ᵃ in the head, as may be clearly understood from Figs. 9 and 10.

For rotating the spindle 16 two means are provided, one adapted to be operated by hand and the other by power. The power-operated means comprises a bevel-gear 40, which is mounted on the spindle above the hanger 14, having a spline or key 40ᵃ engaging a longitudinal channel or key-seat 16ᵃ on the spindle. Mounted upon the top of the hanger 14 is a bracket 42, in which and in a bracket 43, rigid with the platform 3, there is journaled a shaft 44, at the inner end of which is a bevel-pinion 45, meshing with and driving the gear 40. Power may be communicated to the shaft 44 by a belt over the pulley 46, fast on the shaft, a loose pulley 47 being provided for the usual purpose alongside the pulley 46 on the shaft. The bracket 42 has a hub or bearing 42ᵃ, through which the spindle 16 extends, a bearing for the spindle being provided in the bracket at this point by means of the threaded sleeve 48, which is screwed through the head of the bracket 42. The spindle is stopped longitudinally on this sleeve 48 by means of stop-collars 49 49 above and below the sleeve, and in order to permit the spindle to be quickly adjusted longitudinally through this threaded sleeve and secured against longitudinal movement at adjusted position a key 50, having heads 50ᵃ and shoulders 50ᵇ adapted to the key-seat 16ᵃ of the spindle, is provided for insertion through the sleeve before the spindle is inserted therethrough, having its shoulders 50ᵇ stopped against the respective ends of the sleeve and the heads 50ᵃ stopped, respectively, above and below the stop-collars 49, the stop-collars being channeled to the depth of the shoulders 50ᵇ to afford seats for the key from the shoulders to the heads, respectively, the set-screws 51 of the collars being arranged to impinge upon the key to force it into the seat 16ᵃ for clamping both the collars and the keys to the spindle, the set-screws being relaxed to permit the spindle to slide longitudinally through the sleeve, in which at all times it is free to rotate. A handle 52 at the upper end of the spindle 16 may be used to rotate it by hand when the work does not require more power than could be thus provided. For advancing the tool or work, whichever may be carried on the spindle 16 as the work is performed, the threaded sleeve 48 is provided with a flange 53, having sockets 53ᵃ for a spanner-wrench (not shown) or a lever-handle 54. To prevent the rotation of the sleeve by mere friction of the spindle 16 therein, a block 55, having its face threaded, is lodged in the sleeve, and a clamp-screw 56 is provided for operating against the back side of it to crowd its threaded face against the thread of the sleeve to hold the latter firmly.

For the purpose of leveling the face of the work—that is, adjusting it at right angles to the axis of rotation of the tool—the entire tool-holder, including the head 27, is unscrewed from the shaft 16 and in its place there is attached a leveling device, which will now be described. It comprises a disk 30, having a stem 31 bored and interiorly threaded for attachment to the threaded end of the shaft 16, and being also exteriorly threaded for a jam-nut 32, adapted to be set up against a disk 34, pivotally mounted at the center on the stem 31. The disk 34 has three radial channels 33 33 33 on the face toward the disk 30, and to the lower face of the latter disk there are pivoted three arms 35 35 35 adapted to swing over the face, and concentric with the pivots of said arms said disk 30 has three segmental slots 36 36 36. The arms 35 have each a rigid stud 37 projecting through one of the slots 36 and into one of the radial slots 33 in the disk 34. It will be seen that the movement of any one of the arms 35 about its pivot to the face of the disk 30 will cause the latter disk to turn about the stem 31, thus giving each of the other arms 35 movement similar to that of the other arm, from which the movement originates, so that the three arms 35 at all times sustain like relations to the respective radial slots 33, with which they are engaged by their studs 37. Each of said arms 35 has a stud 39 projecting from the side remote from the disks, all said studs being of the same length and being located at the same distance from the pivots of the arms to the disk 30, and said arms being adjusted so as to bring the studs 39 within the area of the face to be dressed. The work being advanced up against these studs by the thrust-rod 8 is caused to assume a position with that face in proper plane—at right angles to the axis of the shaft 16—for being operated upon by the tool which may afterward be substituted on said shaft for the leveling device described. The location of the studs 39 all at the same distance from the pivots of the respective arms causes them to be located at equal distances also from the axis of the shaft, so that at any position to which the arms may be adjusted these studs define a circle about the axis, affording convenient means by which the work may not only be leveled, but also may be centered with sufficient accuracy.

In Fig. 5 the arms 35 are shown with an extension-piece 35ª for lengthening them for extra large work. For work of lesser diameter these extensions may be removed. When they are used, each of them is secured by a screw 41 to the principal arm and is engaged by the stud 39, for which an aperture is made at the proper place on the extension-piece, a corresponding stud 39 being provided on the said extension-piece 35ª, as shown.

The lugs 2 2 2 2 are preferably cylindrical, as illustrated, and extend up through the platform 3, below which they are provided with stop-collars 2ª, provided with set-screws 2ᵇ for securing them at adjusted position on the legs, and the legs are similarly graduated, as seen at 2ᵈ, so that the stop-collars may be adjusted to the same height on all the legs. For making the platform 3 fast and suitably rigid with the legs at any position to which it may be adjusted said table has lugs 3ᵇ, projecting radially with respect to each of the apertures through which the legs 2 extend, said lugs being split, the split extending into said apertures and provided with clamping-bolts 3ᵉ, by means of which the apertures may be contracted to cause the platform to grip the legs firmly. This construction makes it possible to adjust the rotatable tool or work holder and all the means for rotating it down very near to the working position, so as to avoid the necessity of protruding the rotating shaft from its bearings, thus avoiding the inconvenience and defective operation which is liable to result from the springing of the shaft when it is protruded too far from its bearings. For a similar purpose and adapted to be employed under some conditions which do not admit of the adjustment of the platform on the legs, as above described, the sleeve 15, above described, is provided with the construction which adapts it to be protruded from the bearing 14ᶜ to reinforce the shaft 16 when the latter is necessarily protruded considerably from the end of said bearing. These two methods of effecting the same general purpose or preventing the springing of the spindle have each their appropriate use in the different sorts of work to which the machine is adapted.

I claim—

1. In a machine for the purpose indicated, in combination with a frame comprising a base for supporting the work, tool-operating devices overhanging the work-support and comprising a vertical rotatable shaft for driving the tool; a leveling device adapted to be carried by the shaft having its leveling-points facing downward; work-holding jaws mounted on the base; a plunger mounted for thrusting up through the base within the jaws for lifting the work against the leveling devices, and means for operating the plunger.

2. In a machine for the purpose indicated, in combination with a base, work-holding jaws mounted on the base; a work-carrier adapted for supporting the work within the jaws; a plunger mounted for thrusting up through the base against the under side of the work-carrier for lifting the latter and the work thereon, the carrier having a plurality of supports on the base independently adjustable vertically, and means for operating the plunger.

3. In a machine for the purpose indicated, in combination with a base for supporting the work, work-holding jaws mounted on the base; a plunger mounted for thrusting up through the base against the under side of the work, and means for operating the plunger.

4. In a machine for the purpose indicated, in combination with the frame having a base for supporting the work; devices adapted for operating a tool; a leveling device carried thereby; work-holding jaws mounted on the base; a rod or bar mounted for thrusting upwardly through the base against the under side of the work, and means for operating said thrust-rod.

5. In a machine for the purpose indicated, in combination with a vertically-mounted rotating tool-operating shaft; a leveling device interchangeable with the tool-holder on said shaft; a base having radial channeled ribs and a central hub or boss adapted for supporting the work under said device; work-holding jaws mounted for movement in the channels of said ribs for engaging the work; a thrust-rod mounted for vertical movement through said central hub or boss for encountering the under side of the work to lift the same against the leveling device, and means for operating such thrust-rod.

6. In a machine for the purpose indicated, in combination with a base having upwardly-projecting radial channeled ribs, a work-carrier having radial apertures corresponding in position to the ribs of the base and having vertically-adjustable feet stepped on the base in the angles between the ribs; work-gripping jaws in the channels of the ribs protruding up through the apertures in the carrier and means for operating them to grip the work lodged on the latter; a thrust-rod mounted for vertical movement through the base at the center adapted to impinge upon the under side of the carrier for lifting the latter, and means for operating the thrust-rod to lift the carrier and the work thereon.

7. In a machine for the purpose indicated, in combination with the base and means thereon for carrying the work, means for lifting the work adapted to permit the work to tilt over it in any direction; a leveling device and means for carrying it above the work, and means on the base for gripping the work adapted to be operated for so gripping it after the work is lifted against the leveling device.

8. In a machine for the purpose indicated, in combination with a base, a carrier mounted thereon for supporting the work; means for lifting the carrier at the center adapted to permit it to tilt in any direction over said lifting means; a leveling device and means for carrying it in position overhanging the work, and gripping-jaws mounted on the base and extending through the carrier and means for operating them to grip the work after the latter is advanced upwardly against the leveling device.

9. In a machine for the purpose indicated, in combination with a base and means for supporting and securing the work thereon, a platform overhanging the base; tool-operating devices mounted on such platform comprising a vertical bearing, a sleeve longitudinally adjustable through such bearing, means for releasably securing the sleeve at adjusted position in the bearing, a tool-operating shaft journaled in the sleeve adapted for carrying a tool at the lower end of the sleeve, and means above the sleeve for rotating said shaft.

10. In a machine for the purpose indicated, in combination with a base and means for supporting and securing the work thereon; a platform overhanging the base; tool-operating devices mounted on such platform comprising a vertical bearing; a sleeve longitudinally adjustable through such bearing; means for releasably securing the sleeve at adjusted position in said bearing; a tool-operating shaft journaled in the sleeve and means above said sleeve for rotating it; a tool-holder secured to the lower end of the shaft; a dog mounted in the sleeve and projecting in the path of rotation of the tool-holder, and tool-feeding devices on the tool-holder adapted to be encountered by said dog once in each rotation of the shaft.

11. In a machine for the purpose indicated, in combination with a chuck, a bearing rigid therewith; a sleeve journaled and longitudinally adjustable in such bearing; means for releasably clamping the sleeve in the bearing; a rotatable spindle and means for rotating it journaled in the sleeve and protruding therefrom at both ends; a second sleeve journaled and longitudinally stopped on the spindle, and a bearing fixed with respect to the chuck through which said second sleeve is screwed.

12. In a machine for the purpose indicated, in combination with a rotating spindle, a sleeve in which it is journaled, and a fixed support through which the sleeve is screwed, the spindle having a longitudinal key-seat; stop-collars on the spindle at opposite ends of the sleeve; a key fitting the key-seat and having shoulders by which it is longitudinally stopped on the sleeve, and heads by which it is longitudinally stopped at opposite sides of the stop-collars respectively, and set-screws in the stop-collars operating on the key for forcing it into the key-seat.

13. In a machine for the purpose indicated, in combination with a base and means for supporting and securing the work thereon, a platform overhanging the base and tool-operating devices mounted on the platform comprising a vertical bearing and a tool-spindle journaled therein protruding therethrough toward the work-support, the means for supporting the platform above the base consisting of legs or standards upstanding from the base and protruding through the platform; adjustable stops on the legs or standards respectively below the platform, and means for making the platform rigid with the legs.

14. In a machine for the purpose indicated, in combination with a base for supporting the work, a platform for supporting the tool-operating devices, the legs or standards projecting upward from the base and extending through the platform, the platform being slotted or split from the apertures through which said legs respectively protrude to the edge, and means for drawing the split portions together to clamp the platform to the legs.

15. In a machine for the purpose indicated, in combination with a base for supporting the work, a platform for supporting the tool-operating devices; graduated legs or standards projecting up from the base, the platform having split bearings through which said legs project; stop-collars on the legs below the platform, and means for securing them at adjusted position on the graduated legs, and means for clamping the split bearings upon the legs.

In testimony whereof I have hereunto set my hand, in the presence of two witnesses, at Chicago, Illinois, this 6th day of September, 1905.

FRANK L. SMITH.

In presence of—
  J. S. ABBOTT,
  L. M. SMITH.